United States Patent
Sheshadri et al.

(10) Patent No.: US 12,207,226 B2
(45) Date of Patent: Jan. 21, 2025

(54) DEVICE TRACKING WITH RADIO RANGING AND SENSOR FUNCTIONS

(71) Applicant: NEC Laboratories America, Inc., Princeton, NJ (US)

(72) Inventors: Ramanujan Sheshadri, Jersey City, NJ (US); Karthikeyan Sundaresan, Manalapan, NJ (US); Md. Shaifur Rahman, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 374 days.

(21) Appl. No.: 17/722,721

(22) Filed: Apr. 18, 2022

(65) Prior Publication Data

US 2022/0338158 A1 Oct. 20, 2022

Related U.S. Application Data

(60) Provisional application No. 63/176,922, filed on Apr. 20, 2021.

(51) Int. Cl.
| | | |
|---|---|---|
| *H04W 64/00* | (2009.01) | |
| *G01S 5/02* | (2010.01) | |
| *H04B 17/27* | (2015.01) | |
| *H04B 17/318* | (2015.01) | |

(52) U.S. Cl.
CPC .......... *H04W 64/006* (2013.01); *G01S 5/021* (2013.01); *G01S 5/0236* (2013.01); *G01S 5/0284* (2013.01); *H04B 17/27* (2015.01); *H04B 17/318* (2015.01)

(58) Field of Classification Search
CPC ..... H04W 64/006; H04W 64/00; G01S 5/021; G01S 5/0236; G01S 5/0284; G01S 2205/01; G01S 5/0205; G01S 5/0264; G01S 5/0294; G01S 2201/02; H04B 17/27; H04B 17/318
See application file for complete search history.

(56) References Cited

U.S. PATENT DOCUMENTS

| | | | |
|---|---|---|---|
| 10,254,378 B1* | 4/2019 | Dang | G01C 21/1654 |
| 11,283,533 B1* | 3/2022 | Gray | H04B 17/373 |
| 2016/0379074 A1* | 12/2016 | Nielsen | G01S 19/485 |
| | | | 348/143 |
| 2017/0082727 A1* | 3/2017 | Sendonaris | H04W 64/00 |
| 2020/0267504 A1* | 8/2020 | Kim | H04W 4/029 |
| 2022/0095256 A1* | 3/2022 | Lee | G01S 5/021 |
| 2022/0155079 A1* | 5/2022 | Chidlovskii | G06F 18/2148 |

OTHER PUBLICATIONS

Mohamed et al., "A survey on odometry for autonomous navigation systems". IEEE Access, Aug. 2019, pp. 1-21.

(Continued)

*Primary Examiner* — Lester G Kincaid
*Assistant Examiner* — Abdullah Al Mamun
(74) *Attorney, Agent, or Firm* — Joseph Kolodka

(57) ABSTRACT

Methods and systems for identifying device positions include measuring radio signal strength information between devices. Inertial information is measured for the devices. The radio signal strength information and the inertial information are fused to determine relative locations between the devices. The relative locations are oriented to a fixed anchor node. Elevation is estimated for the plurality of devices using pressure sensor information.

14 Claims, 6 Drawing Sheets

(56) References Cited

OTHER PUBLICATIONS

Bo et al., "Smartloc: push the limit of the inertial sensor based metropolitan localization using smartphone", InProceedings of the 19th annual international conference on Mobile computing & networking, Sep. 2013, pp. 195-198.

Dhekne et al., "Trackio: Tracking first responders inside-out", In Proceedings of the 16th USENIX Conference on Networked Systems Design and Implementation, Feb. 2019, pp. 1-15.

Fang et al., "Experimental evaluation of rgb-d visual odometry methods", Journal of Advanced Robotic Systems, Nov. 2014, pp. 1-16.

Fortun et al., "Optical flow modeling and computation: A survey", Computer Vision and Image Understanding, Feb. 2015, pp. 1-21.

Robert Harle, "A survey of indoor inertial positioning systems for pedestrians", IEEE Communications Surveys & Tutorials, Jan. 2013, pp. 1281-1293.

Ijaz et al., "Indoor positioning: A review of indoor ultrasonic positioning systems", In 2013 15th International Conference on Advanced Communications Technology, Jan. 2013, pp. 1146-1150.

Ayyalasomayajula et al., "Locap: Autonomous millimeter accurate mapping of wifi infrastructure", In 17th USENIX Symposium on Networked Systems Design and Implementation, Feb. 2020, pp. 1115-1129.

Kotaru et al., "Spotfi: Decimeter level localization using wifi", In Proceedings of the 2015 ACM Conference on Special Interest Group on Data Communication, SIGCOMM '15, Aug. 2015, p. 269-282.

Milford et al., "Vision-based simultaneous localization and mapping in changing outdoor environments", Journal of Field Robotics, Sep. 2014, pp. 1-52.

Nelson et al., "From dusk till dawn: Localisation at night using artificial light sources", In2 015 IEEE International Conference on Robotics and Automation (ICRA), May 2015, pp. 5245-5252.

Nowacki et al., "Capabilities of ARCore and ARKit Platforms for AR/VR Applications" In International Conference on Dependability and Complex Systems, Jul. 2019, pp. 358-370.

Rahman et al., "Dynoloc: Infrastructure-free rf tracking in dynamic indoor environments", arXiv preprint arXiv:2110.07365, Oct. 2021, pp. 1-15.

Rajagopal et al., "Improving augmented reality relocalization using beacons and magnetic field maps", In 2019 International Conference on Indoor Positioning and Indoor Navigation (IPIN), Oct. 2019, pp. 1-8.

Shen et al., "Closing the gaps in inertial motion tracking", In Proceedings of the 24th Annual International Conference on Mobile Computing and Networking, Oct. 2018, pp. 429-444.

Shen et al., "I am a smartwatch and i can track my user's arm", In Proceedings of the 14th annual international conference on Mobile systems, applications, and services, Jun. 2016, pp. 85-96.

Soltanaghaei et al., "Multipath triangulation: Decimeter-level wifi localization and orientation with a single unaided receiver", In Proceedings of the 16th annual international conference on mobile systems, applications, and services Jun. 2018, pp. 376-388.

Niehorster et al., "The accuracy and precision of position and orientation tracking in the htc vive virtual reality system for scientific research", i-Perception, May 2017, pp. 1-23.

Taketomi et al., "Visual slam algorithms: a survey from 2010 to 2016", PSJ Transactions on Computer Vision and Applications. Dec. 2017, pp. 1-11.

Vasisht et al., "Decimeter-level localization with a single wifi access point", In 13th USENIX Symposium on Networked Systems Design and Implementation, Mar. 2016, pp. 165-178.

Xie et al., "Md-track: Leveraging multi-dimensionality for passive indoor wi-fi tracking", In The 25th Annual International Conference on Mobile Computing and Networking, Aug. 2019, pp. 1-16.

Xiong et al., "Tonetrack: Leveraging frequency-agile radios for time-based indoor wireless localization", InProceedings of the 21st Annual International Conference on Mobile Computing and Networking, Sep. 2015, pp. 537-549.

\* cited by examiner

DEVICE TRACKING WITH RADIO RANGING AND SENSOR FUNCTIONS

RELATED APPLICATION INFORMATION

This application claims priority to U.S. Patent Application No. 63/176,922, filed on Apr. 20, 2021, incorporated herein by reference in its entirety.

BACKGROUND

Technical Field

The present invention relates to localization and tracking and, more particularly, to real-time indoor tracking of assets.

Description of the Related Art

The ability to localize and track both people and assets in real-time, particularly in environments where global positioning satellite (GPS) signals are not available, is useful for a variety of different applications. For example, such localization may be used to facilitate collaborative tasks between humans and robots.

SUMMARY

A method for identifying device positions includes measuring radio signal strength information between devices. Inertial information is measured for the devices. The radio signal strength information and the inertial information are fused to determine relative locations between the devices. The relative locations are oriented to a fixed anchor node. Elevation is estimated for the plurality of devices using pressure sensor information.

A method for deploying devices in an interior space includes identifying device positions within an interior space by fusing radio signal strength information and inertial information from devices to determine relative locations between the devices. The relative locations are oriented to a fixed anchor node. Elevation is estimated for the devices using pressure sensor information. A map of the interior space is generated with the device positions. Resources are deployed to the interior space based on the map.

A system for identifying device positions includes a hardware processor and a memory that stores a computer program. When executed by the hardware processor, the computer program causes the hardware processor to measure radio signal strength information between devices, to measure inertial information for the devices, to fuse the radio signal strength information and the inertial information to determine relative locations between the devices, to orient the relative locations to a fixed anchor node, and to estimate elevation for the plurality of devices using pressure sensor information.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To help provide localization of devices within an indoor environment, where global positioning satellite (GPS) signals may not be useful, a combination of different types of information may be used. For example, information from ultra-wide band radios may be combined with inertial and pressure sensor measurements from the device to find a three-dimensional indoor position for the device. In this manner, each device may identify relative locations between itself and other devices, and the entire system of devices may then be oriented relative to an anchor device to provide an absolute three-dimensional location.

The radio data and inertial data can be combined to reduce noise in the position estimations while estimating a two-dimensional location along the plane of a given floor of a building. Pressure sensor data can be used to identify the altitude of the device and, thus, the floor of the building. In particular, devices may be grouped according to their pressure sensor data, and deviations in pressure sensor data can be confirmed by changes in the radio data and inertial data to confirm that the device has moved from one floor to another.

Figure 1:
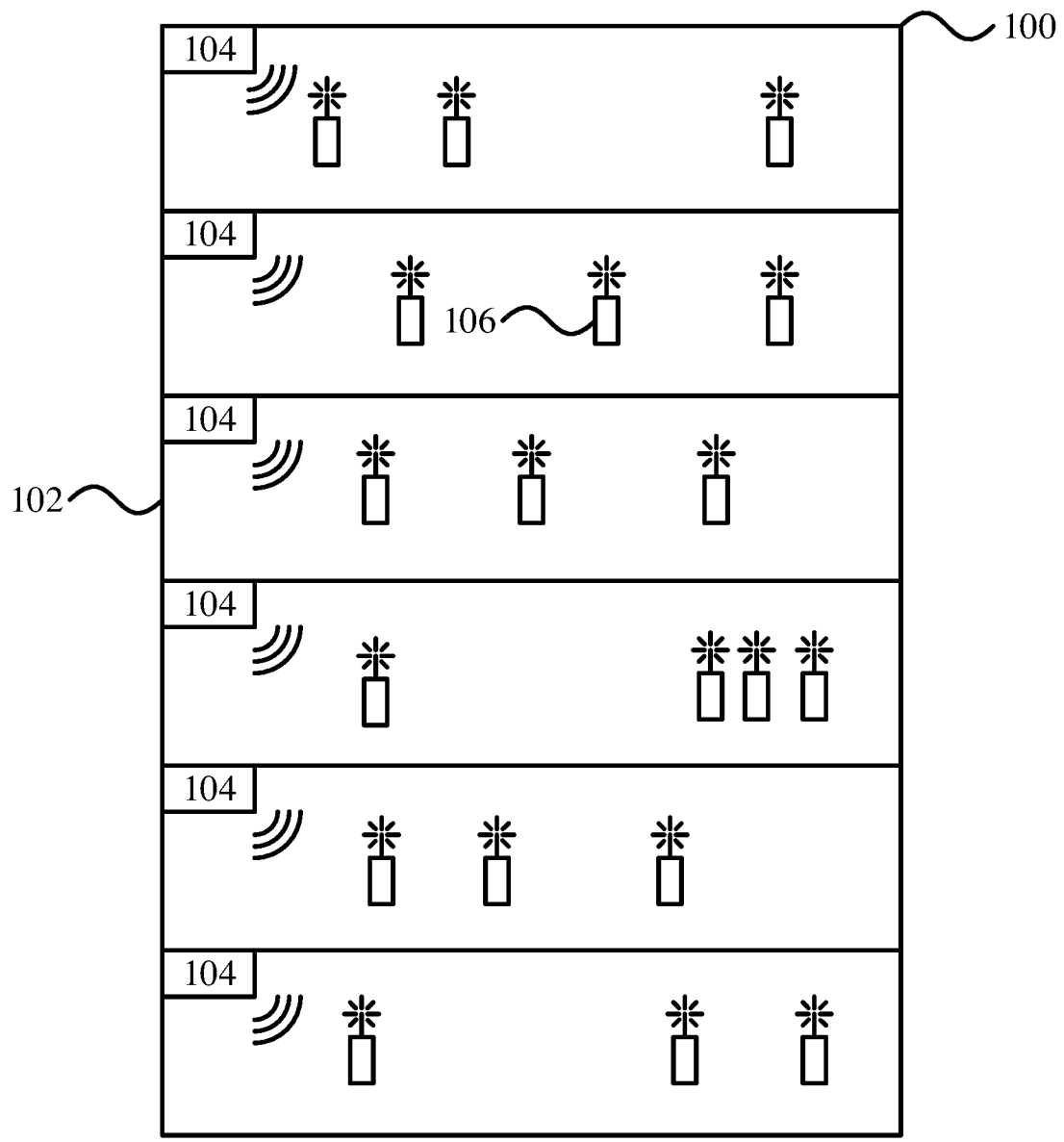
FIG. 1 is a diagram of a building with devices distributed through an interior space, with device localization being provided by a combination of radio signal strength information and inertial information, in accordance with an embodiment of the present invention.

Referring now to FIG. 1, a diagram of localization of devices within a building 100 is shown. The building includes a set of different floors 102, each at a different altitude. The internal configurations of the floors 102 are omitted for the sake of simplicity. On each floor, there is at least one anchor node 104. Each anchor node 104 may include an ultra-wide band transceiver that communicates with devices 106 in the building 100. During deployment, the real-world coordinates of each anchor node 104 may be determined.

The building 100 may be partially or entirely opaque to GPS signals, such that the devices 106 may not be able to reliably determine their positions in space using GPS information. The devices 106 may include any of a variety of different mobile electronic devices. For example, the devices 106 may include mobile telecommunication devices, such as cellphones, but the devices 106 may also include inventory tags or any other appropriate device. The devices 106 may each include an ultra-wide band transceiver as well as sensors, such as inertial sensors and pressure sensors.

Within each floor, the devices 106 may locate one another using the ultra-wide band transceivers and inertial sensors. A two-dimensional map of the relative positions of the devices 106 on each floor 102 may be constructed using a combination of these information streams. The two-dimensional map may then be oriented with respect to the anchor node 104, based on known real-world coordinates for the anchor node 104, providing absolute localization for each device 106 on the floor. The sensor information, which may be averaged across all the devices 106 on the floor 102, may provide an indication of the altitude of the devices 106 and, hence, of which floor 102 they are on.

The anchor nodes 104 may have multiple antennas (e.g., more than three) and may be capable of estimating angle-of-arrival information. If anchor nodes 104 have only one antenna each, then multiple anchor nodes 104 may be positioned on each floor 102, at a sufficient distance from one another, to provide orientation.

Figure 2:
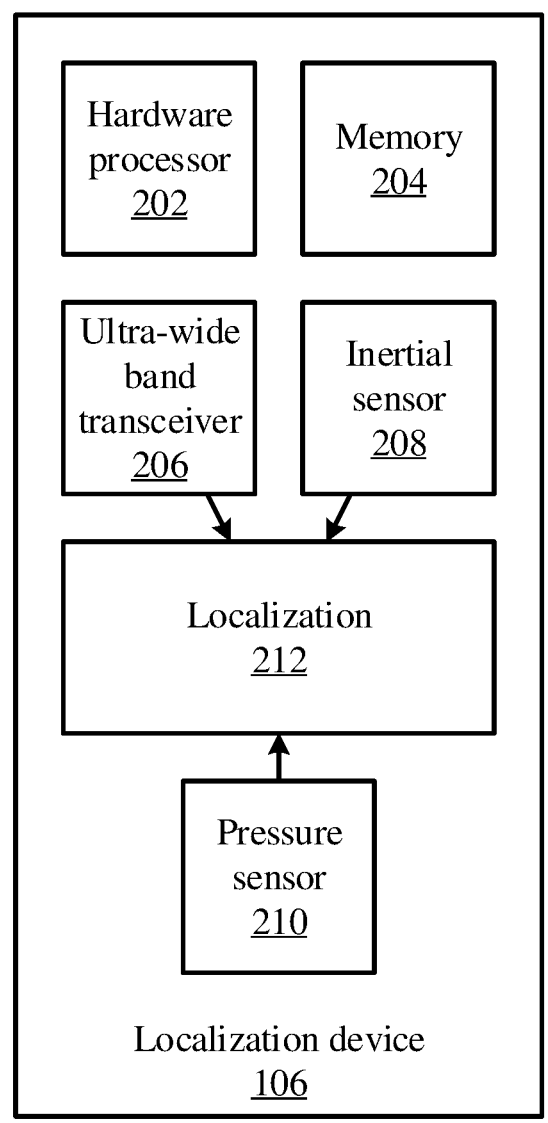
FIG. 2 is a block diagram of a device that may be localized within an interior space using a combination of radio signal strength information, inertial information, and atmospheric pressure information, in accordance with an embodiment of the present invention.

Referring now to FIG. 2, a block diagram of one of the devices 106 for localization is shown. The device 106 may include a hardware processor and memory 204, as well as any appropriate software that is needed to operate the device. The device 106 includes an ultra-wide band transceiver 206 that is configured to communicate with the anchor node 104 on a floor 102, as well as with other devices 106 on the floor 102.

Although ultra-wide band communications are specifically contemplated, it should be understood that other radio frequency technologies may be used instead. As used herein, "ultra-wide band" may refer to signals at frequencies between 3 and 6 GHz with a relatively wide bandwidth. It is also contemplated that mmWave radio frequencies can be used, between 24 and 30 GHz, but ultra-wide band signals generally penetrate objects better. These signals can be used to provide relative localization to within a few centimeters for objects that are in line of sight.

While ultra-wide band systems provide high accuracy, their accuracy in non-line of sight conditions can vary. Although ultra-wide band signals can penetrate some objects, their signal power decreases rapidly through such media. Erroneous ranges can have a cascading effect on the localization error. To address this, data from an inertial sensor 208 may be combined with localization information from the ultra-wide band transceiver 206 to improve location estimation.

A pressure sensor 210 may be used to detect the atmospheric pressure at the device 106. Because atmospheric pressure varies with altitude, this information provides an indication for how far the device 106 is above sea level. Thus, the detected pressures at devices 106 on different floors 102 will provide an indication of their heights relative to one another. The pressure information may take into account other factors, such as temperature and humidity.

Localization 212 synthesizes all of this information. In addition, localization 212 coordinates with other devices 106 to form a two-dimensional map of the devices 106 on a given floor, which may be oriented using communications with the anchor device 104 by at least one of the localization devices 106.

Localizing a device 106 in a multi-floor indoor area includes solving for a three-dimensional location along an X, Y, and Z plane, which may be understood as being split into position (X,Y) and elevation (Z). By decoupling these two problems, the hardware of the localization device can be simplified, as contrasted to devices which use angle-of-arrival information to combine position information with elevation information.

Figure 3:
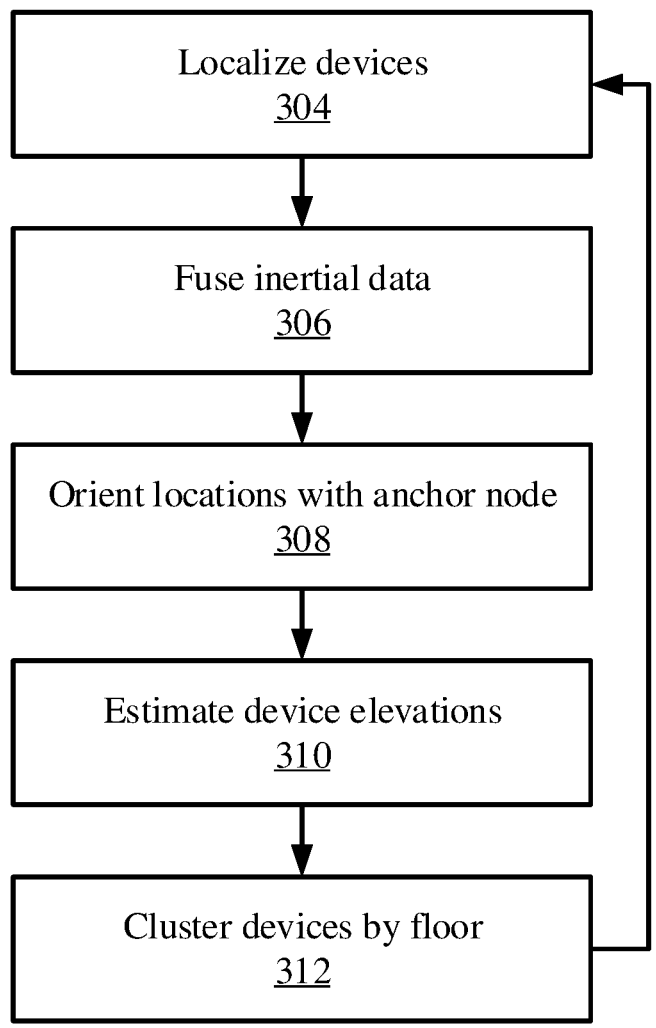
FIG. 3 is a block/flow diagram of a method of localizing devices within an interior space using a combination of radio signal strength information, inertial information, and atmospheric pressure information, in accordance with an embodiment of the present invention.

Referring now to FIG. 3, a method for determining absolute three-dimensional localization for one or more devices 106 in a building 100 is shown. Block 302 localizing the devices 106 with respect to one another, for example using ultra-wide band transceivers 206. This information establishes relative locations for the devices 106 on a given floor 102. Errors in the location information provided by the ultra-wide band localization, for example due to signal attenuation through objects, may be corrected or reduced using inertial information from inertial sensors 208 in block 304.

The resulting map of relative locations can then be oriented relative to an anchor node 104 using ultra-wide band localization between the anchor node 104 and at least one of the devices 106 on the respective floor 102. Device elevations 310 may then be estimated by block 310, using the pressure sensors 210. Block 312 may then cluster the devices by floor 102, identifying which devices 106 are on the same floor 102, and the anchor node 104 on the floor 102 may be included in the cluster with the devices 106 on that floor 102. This information may be used in subsequent iterations. The process may be repeated periodically, for example updating device locations every few seconds.

Within each cluster (e.g., among the devices 106 on a given floor 102), ultra-wide band localization and inertial information may be combined using a Kalman filter, for example in block 306. The ultra-wide band localization information provides a connectivity graph for each cluster of devices 106. Rigid sub-graphs may then be identified (e.g., three-core sub-graphs) using a multi-dimensional solver. For devices that are not part of a rigid sub-graph (e.g., devices which have fewer than three edges), inertial data may be introduced to deduce the devices' locations.

The rigid sub-graph may be represented using an adjacency matrix, such as a Euclidean distance matrix, with the ranges being stored as edge weight entries in the matrix. Multi-dimensional scaling may be used to convert the range estimates into relative locations on a two-dimensional plane.

Spatial separation of the devices 106 may be used to optimize ultra-wide band ranging. Clustering the devices across floors makes it possible to schedule device ranging operations in parallel across different clusters of devices. Within each cluster, pairs of nodes devices may be identified that are not within one another's interference range, for example using the ultra-wide band connectivity graph from a previous epoch, to help schedule concurrent ranging operations.

To use the inertial information, linear acceleration may be integrated twice to obtain a displacement. To reduce the error-growth rate, a zero velocity update may be used. Identifying zero velocity intervals bounds the error growth in the inertial sensors 208 between zero-velocity intervals. Location may be estimated when the velocity is greater than zero. Attitude information may be determined by fusing the data from the accelerometer, gyroscope, and magnetometer within the device 106. Attitude information may then be used to rotate the location estimated from the inertial sensor's frame of reference to the world frame of reference (e.g., orienting to Earth's magnetic north). A Kalman filter, Bayesian filter, or particle filter may be used to filter out noise in the location estimates.

The location determined from the inertial data is oriented with respect to the Earth's magnetic poles. This orientation may be rotated by an angle θ, which represents the difference between the device's heading as determined by the inertial sensor 208 and the device's heading as determined from ultra-wide band measurements. This alignment is needed to fuse the two sets of data.

The Kalman filter may be implemented using recursive execution of a prediction phase and an update phase. The update phase may be executed twice, for each respective location estimate from each respective data source. The output of each recursive cycle is a single (X,Y) location per device.

The prediction phase may include calculation of:

$$X_k = f(X_{k-1}, q_{k-1})$$

and $$P_k = A_k \cdot P_{k-1} \cdot A_k^T + W_k \cdot Q_{k-1} \cdot W_k^T$$

where $X_k$ is the predicted system state, $X_{k-1}$ is the previous system state, $q_{k-1}$ is stochastic system noise, $P_k$ is an error covariance matrix, $P_{k-1}$ is the error covariance matrix of $X_{k-1}$, $Q_{k-1}$ is a process noise covariance matrix, and A and W are state transition matrices.

The Kalman gain can then be determined to identify how much the inertial position estimates should be corrected at a time step k:

$$K_k = P_k \cdot H_k^T (H_k \cdot P_k \cdot H_k^T + R_k)$$

where $K_k$ is the Kalman gain and $R_k$ is a measurement noise covariance matrix. The Kalman filter is then used to calculate the state estimates:

$$X_k' = X_k + K_k(Z_k - H(X_k))$$

where $Z_k$ is a measurement vector from the ultra-wide band information and $H(X_k)$ is a measurement model of the system. The error covariance matrix may then be updated:

$$P_k' = (I - K_k \cdot H_k) \cdot P_k$$

Having fused the data to generate the relative positions, absolute positions of each device 106 may be determined. First, the anchor node 104 may be designated as a reference device, with the locations of all other nodes on that floor 102 being estimated with respect to the reference device. Next, the first floor's anchor node 104 may be designated as an absolute origin, and the locations of all other devices may be estimated relative to that absolute origin.

In cases where the ultra-wide band location estimates are unavailable for a significant amount of time, such as when all peer devices are far away or in a non-line of sight location, inertial location estimates can be used alone. As the inertial data of isolated devices becomes noisier, inertial positions may be reset to a position estimated by ultra-wide band ranging. This reset may be performed periodically (e.g., every 15-20 7 seconds). A measured ultra-wide band link quality may be compared to a threshold. If the link quality is above the threshold, then the location determined by the ultra-wide band ranging may be deemed to be accurate, and may be used to reset the inertial positioning information.

As to elevation, as a device's elevation increases or decreases, the atmospheric pressure dopes or rises, respectively. However, absolute pressure values may not directly correspond to an elevation, due to weather-related changes in ambient pressure. However, measuring the relative change in pressure can be used to indicate changes in elevation. A moving window of pressure values may be maintained for each device 106. If, within the window, the pressure values change significantly (e.g., by an amount greater than a threshold value), this may be interpreted as a change from one floor 102 to another.

Other things may change barometric pressure values, however, and may be unrelated to a change in a device's elevation. For example, rapid weather changes or faulty sensor measurements may create false positives. Elevation estimates may be validated based on information from the ultra-wide band transceiver, for example comparing received signal strengths from devices having similar elevation values. For example, if nearby devices 106 have strong signal strengths and similar elevation estimates, then the elevation estimate may be validated as true. As the elevation changes, the signal strengths of other devices may be used to determine whether the new elevation value is in agreement with elevation values of nearby devices.

However, if there is no significant change in the received signal strength information, inertial information may be used to validate the transition. For example, if there are no nearby devices to check against, displacement along the vertical Z axis may be estimated using linear acceleration from the inertial sensor 208. If the acceleration along this axis is not significant within a same window as the change in pressure values, then the elevation change may be discarded as erroneous.

Figure 4:
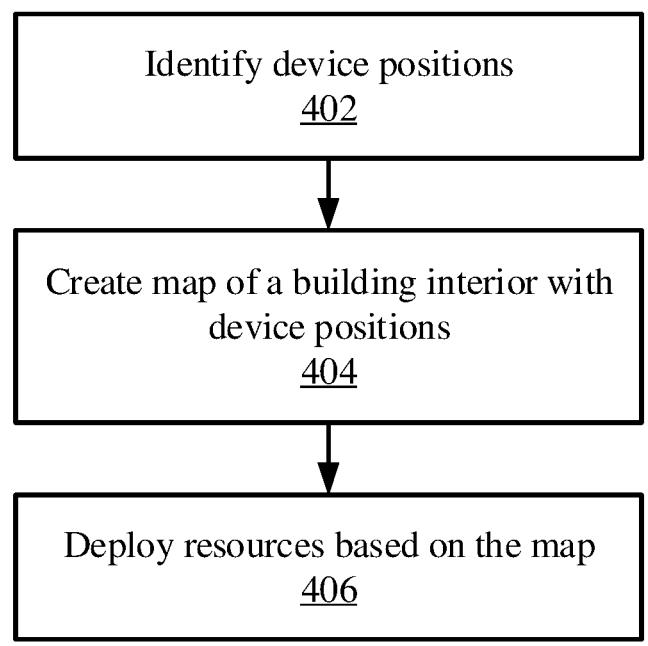
FIG. 4 is a block/flow diagram of a method for deploying resources within an interior space using device localization information, in accordance with an embodiment of the present invention.

Referring now to FIG. 4, a method of creating and using a map of devices within a building is shown. Block 402 identifies device positions within a building interior, for example using a fusion of radio signal ranging, inertial sensor information, and pressure sensor information. Individual devices 106 may communicate their respective data to a central system that calculates the positions of all of the devices based on combinations of each of the devices' data.

The central system uses this data to create a map of the building's interior at block 404. For example, the device positions may be superimposed on a preexisting map of the building's interior, to identify the location of each such device. Block 404 may further include creating the map of the building's interior itself, by tracking movements of the devices within the building. For example, tracking the motion of cellphones can help to identify pathways through the building.

Block 406 deploys resources based on the map. The map can be used in a variety of applications. For example, asset tracking may be used to identify inventory and stocking levels within a store, and deploying resources may include restocking items that are running out. Device tracking may further be used for emergency response purposes, to identify the locations of people within the building for rescue in the event of a fire or natural disaster. The mapping may further be used to help responders navigate within the building, following paths that are generated by tracking devices through the building. Other potential applications include tracking workers and assets in construction zones, for example where it may not be possible to implement an infrastructure-based localization system, or tracking workers in large factories, where deploying a dedicated localization system would be cost prohibitive.

Figure 5:
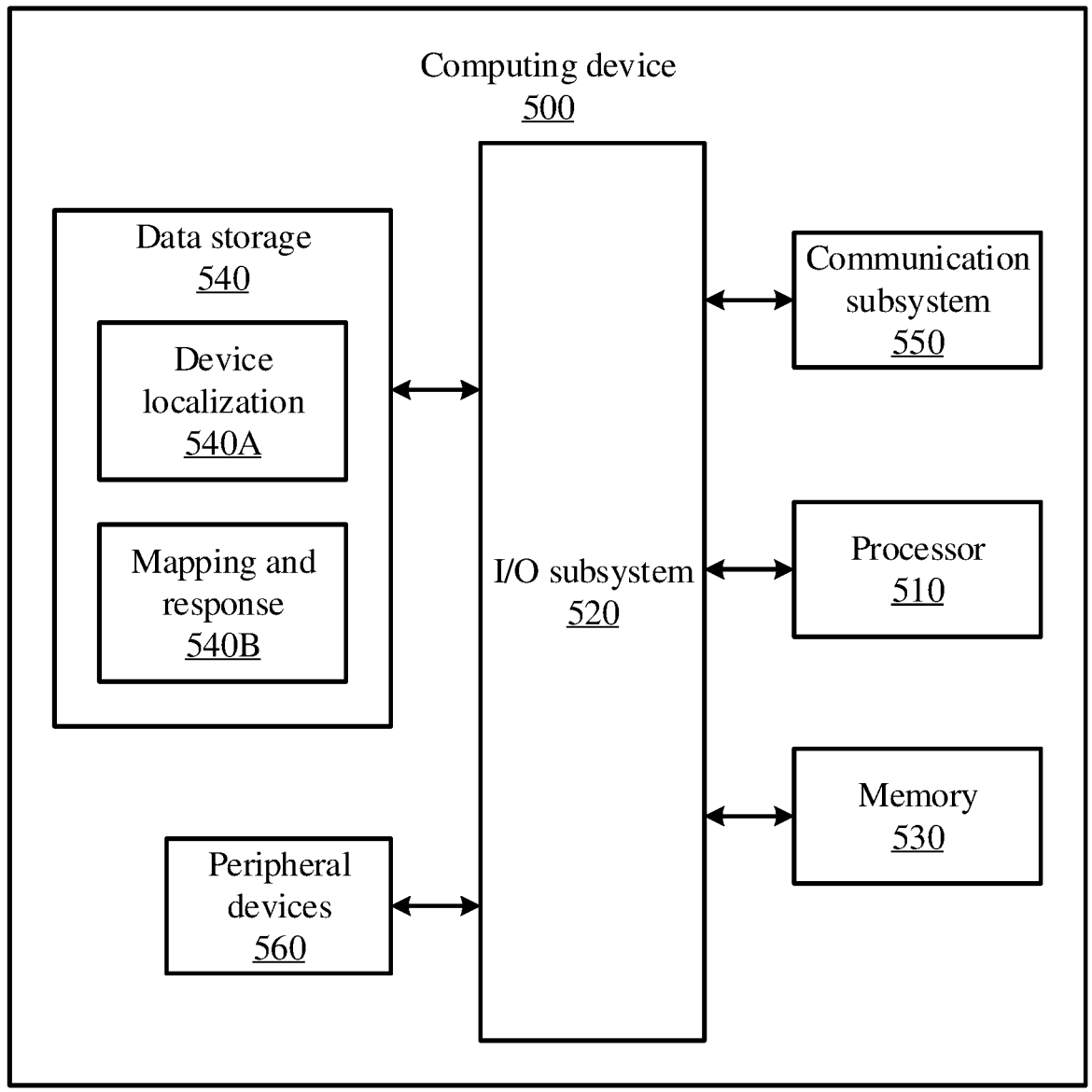
FIG. 5 is a block diagram of a computing device that can perform device localization within an interior space and can perform mapping and responses within the interior space, in accordance with an embodiment of the present invention.

Referring now to FIG. 5, an exemplary computing device 500 is shown, in accordance with an embodiment of the present invention. The computing device 500 is configured to perform classifier enhancement.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as a one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for localizing devices within a building, based on radio ranging information, inertial sensor information, and pressure sensor information, and 540B for mapping a building interior and responding to device positioning. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
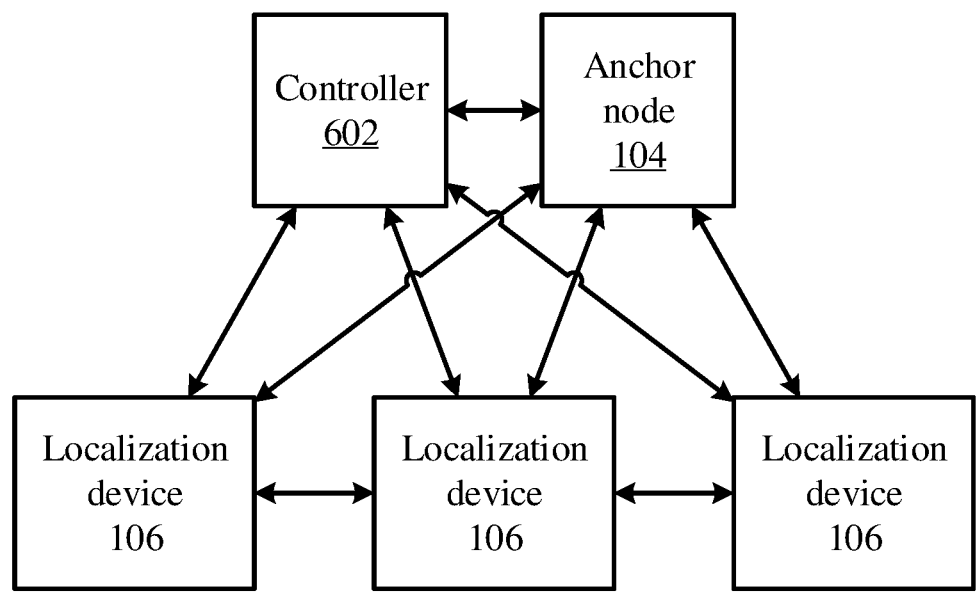
FIG. 6 is a block diagram showing communications between devices, an anchor node, and a controller for localization, in accordance with an embodiment of the present invention.

Referring now to FIG. 6, a diagram of communications between the localization devices 106, the anchor node 104, and a controller 602 is shown. These devices may communicate with one another by any appropriate wired or wireless communications medium and protocol. The localization devices 106 communicate with one another, for example by exchanging radio signal strength information that is used for determining ranges. The devices 106 communicate with the anchor node 104 for a similar purpose. Each device 106 and anchor node 104 communicates with a controller 602, which may be implemented as computing device 500. The controller 602 collects radio signal strength information, inertial sensor information, and pressure sensor information and uses this information to determine the positions of the devices 106 within the building 100.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for identifying device positions, comprising:
   measuring radio signal strength information between a plurality of devices;
   measuring inertial information for the plurality of devices;
   fusing the radio signal strength information and the inertial information to determine relative locations between the plurality of devices;
   orienting the relative locations to a fixed anchor node; and
   estimating elevation for the plurality of devices using pressure sensor information, including correlating changes in pressure sensor measurements for a first device of the plurality of devices with movement of the first device between floors of a building and filtering out a change in pressure sensor measurements based on the radio signal strength information by comparing elevation estimates for devices having strong signal strengths to the first device.

2. The method of claim 1, wherein estimating elevation further includes filtering out the change in pressure sensor measurements based on the inertial information.

3. The method of claim 2, wherein filtering out the change in pressure sensor measurements based on the inertial information includes determining that the change in pressure sensor measurements is not temporally correlated with motion of the first device in a vertical axis.

4. The method of claim 1, wherein fusing the radio signal strength information and the inertial information is performed using a Kalman filter.

5. The method of claim 1, wherein fusing the radio signal strength information and the inertial information includes determining a displacement from the inertial information.

6. The method of claim 5, wherein fusing the radio signal strength information and the inertial information further includes aligning the displacement with the spatial information using an orientation to the Earth's magnetic poles.

7. The method of claim 5, wherein fusing the radio signal strength information and the inertial information includes resetting the displacement using the radio signal strength information to decrease noise in the inertial information.

8. A computer-implemented method of deploying resources in an interior space, comprising:
- identifying a plurality of device positions within an interior space by fusing radio signal strength information and inertial information from a plurality of devices to determine relative locations between the plurality of devices;
- orienting the relative locations to a fixed anchor node;
- estimating elevation for the plurality of devices using pressure sensor information, including correlating changes in pressure sensor measurements for a first device of the plurality of devices with movement of the first device between floors of a building and filtering out a change in pressure sensor measurements based on the radio signal strength information by comparing elevation estimates for devices having strong signal strengths to the first device;
- generating a map of the interior space with the device positions; and
- deploying resources to the interior space based on the map.

9. A system for identifying device positions, comprising:
a hardware processor; and
a memory that stores a computer program which, when executed by the hardware processor, causes the hardware processor to:
- measure radio signal strength information between a plurality of devices;
- measure inertial information for the plurality of devices;
- fuse the radio signal strength information and the inertial information to determine relative locations between the plurality of devices;
- orient the relative locations to a fixed anchor node; and
- estimate elevation for the plurality of devices using pressure sensor information, including a correlation of changes in pressure sensor measurements for a first device of the plurality of devices with movement of the first device between floors of a building with a change in pressure sensor measurements being filtered out based on the radio signal strength information by comparison of elevation estimates for devices having strong signal strengths to the first device.

10. The system of claim 9, wherein the computer program further causes the hardware processor to filter out the change in pressure sensor measurements based on the inertial information.

11. The system of claim 10, wherein the computer program further causes the hardware processor to determine that the change in pressure sensor measurements is not temporally correlated with motion of the first device in a vertical axis.

12. The system of claim 9, wherein the computer program further causes the hardware processor to determine a displacement from the inertial information.

13. The system of claim 12, wherein the computer program further causes the hardware processor to align the displacement with the spatial information using an orientation to the Earth's magnetic poles.

14. The system of claim 12, wherein the computer program further causes the hardware processor to reset the displacement using the radio signal strength information to decrease noise in the inertial information.

* * * * *